United States Patent
Waidner et al.

(10) Patent No.: US 7,188,536 B2
(45) Date of Patent: Mar. 13, 2007

(54) FLUID-FILLED SEAT BLADDER HAVING INTEGRAL INTERFACE PANEL

(75) Inventors: John T Waidner, Carmel, IN (US); Duane D. Fortune, Lebanon, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/705,443

(22) Filed: Nov. 10, 2003

(65) Prior Publication Data

US 2005/0097973 A1    May 12, 2005

(51) Int. Cl.
*G01L 1/08* (2006.01)
(52) U.S. Cl. ............................... 73/862.454
(58) Field of Classification Search .......... 73/862, 73/862.381–862.454
See application file for complete search history.

(56) References Cited

U.S. PATENT DOCUMENTS

| | | | | |
|---|---|---|---|---|
| 5,530,978 A | * | 7/1996 | Johenning | 5/669 |
| 5,634,890 A | * | 6/1997 | Morris | 601/166 |
| 5,772,281 A | * | 6/1998 | Massara | 297/284.4 |
| 5,916,664 A | * | 6/1999 | Rudy | 428/178 |
| 5,918,696 A | | 7/1999 | VanVoorhies | |
| 5,975,568 A | * | 11/1999 | Speckhart et al. | 280/735 |
| 5,979,078 A | * | 11/1999 | McLaughlin | 36/29 |
| 5,987,370 A | | 11/1999 | Murphy et al. | |
| 6,101,436 A | | 8/2000 | Fortune et al. | |
| 6,117,095 A | * | 9/2000 | Daggett et al. | 602/19 |
| 6,175,980 B1 | * | 1/2001 | Gaither | 5/654 |
| 6,246,936 B1 | | 6/2001 | Murphy et al. | |
| 6,460,209 B1 | * | 10/2002 | Reeder et al. | 5/690 |
| 6,478,721 B1 | * | 11/2002 | Hunter | 482/140 |
| 6,490,936 B1 | | 12/2002 | Fortune et al. | |
| 6,687,933 B2 | * | 2/2004 | Habboub et al. | 5/654 |
| 6,966,130 B2 | * | 11/2005 | Meschan | 36/25 R |

FOREIGN PATENT DOCUMENTS

DE    297 20 363    2/1998

OTHER PUBLICATIONS

European Search Report dated Feb. 9, 2005.

* cited by examiner

*Primary Examiner*—Max Noori
(74) *Attorney, Agent, or Firm*—Jimmy L. Funke

(57) ABSTRACT

An elastomeric seat bladder has upper and lower sheets of peripherally welded elastomeric material, and at least one of the upper and lower sheets of elastomeric material is sufficiently thick to effectively serve as an integral interface panel. In a first configuration, the lower sheet is formed of elastomeric material having a thickness in the range of 1 mm (0.04 inch) to 2.54 mm (0.100 inch), and the upper sheet is formed of elastomeric material having a thickness of approximately 0.375 mm (0.015 inch). In a second configuration, the relatively thick sheet of elastomeric material is utilized as the upper sheet of the bladder instead of the lower sheet; and in a third configuration, both upper and lower sheets of the bladder are formed of elastomeric material in the range of 1 mm (0.04 inch) to 2.54 mm (0.100 inch) in thickness.

5 Claims, 2 Drawing Sheets

FLUID-FILLED SEAT BLADDER HAVING INTEGRAL INTERFACE PANEL

TECHNICAL FIELD

The present invention is directed to a fluid-filled seat bladder for vehicle occupant weight estimation, and more particularly to a bladder having a structure that effectively takes the place of one or more interface panels.

BACKGROUND OF THE INVENTION

Vehicle occupant detection systems are useful in connection with air bags and other pyrotechnically deployed restraints as a means of judging whether, and how forcefully, to deploy the restraint. For example, it is useful to know the seated weight of the occupant, and whether the detected weight is due to a normally seated child or adult, or a cinched booster seat or infant carrier.

FIG. 1 depicts popular and cost-effective prior art system for providing the above-mentioned occupant data by means of a fluid-filled elastomeric bladder and pressure sensor. Representative bladder-based systems are described, for example, in the U.S. Pat. Nos. 5,987,370; 6,101,436; 6,246,936 and 6,490,936, assigned to the assignee of the present invention, and incorporated herein by reference. Referring to FIG. 1, the reference numeral 10 generally designates a vehicle seat bottom, including a spring suspension 12, a foam cushion 14 and a trim layer 16 of fabric or leather. The underside of cushion 14 is recessed to accommodate a bladder assembly 18 including a fluid-filled bladder 20, and an exit port of the bladder 20 is coupled to a pressure sensor 22 by the tubing 24. In general, the weight of a vehicle occupant resting on the seat bottom 10 is applied to the bladder 20, and an electronic controller 26 coupled to the pressure sensor 22 develops an estimate of the occupant weight based on the measured pressure and its variation with respect to time, as described in the aforementioned U.S. Pat. Nos. 5,987,370 and 6,246,936. The bladder 20 is formed of upper and lower sheets 20a, 20b of elastomeric material such as urethane or polyurethane that are peripherally welded as indicated by the reference numeral 28 to form a closed volume that is filled with a suitable fluid such as silicone. A plurality of inter-peripheral spot welds 30 between the upper and lower sheets 20a, 20b prevent pooling of the silicone fluid and reduce the overall weight of the bladder 20, as described in the aforementioned U.S. Pat. No. 6,101,436. The bladder assembly 18 additionally includes an interface panel 32 and felt pad 34 between the bladder 20 and the seat suspension 12, as disclosed in the aforementioned U.S. Pat. No. 6,490,936. The interface panel 32 protects the bladder 20 from puncture damage and provides a suitable reaction surface for bladder 20, while the felt pad 34 suppresses vibration and provides noise isolation. An interface panel 36 can be also be used above the bladder 20 to improve occupant weight distribution, as also mentioned in the U.S. Pat. No. 6,490,936. However, adding interface panels to the bladder assembly 18 increases the part count and cost of the system, and makes it more difficult to accurately install the assembly in the seat bottom 10. Accordingly, what is needed is a way of achieving the advantages afforded by interface panels without increasing system cost or assembly difficulty.

SUMMARY OF THE INVENTION

The present invention is directed to an improved elastomeric seat bladder for occupant weight estimation, where the bladder is formed by upper and lower sheets of peripherally welded elastomeric material, and at least one of the upper and lower sheets of elastomeric material is sufficiently thick to effectively serve as an integral interface panel. In a first embodiment, the lower sheet of elastomeric material is formed of elastomeric material having a thickness in the range of 1 mm (0.04 inch) to 2.54 mm (0.100 inch), and the upper sheet is formed of elastomeric material having a thickness of approximately 0.375 mm (0.015 inch). In a second embodiment, the relatively thick sheet of elastomeric material is utilized as the upper sheet of the bladder instead of the lower sheet; and in a third embodiment, both upper and lower sheets of the bladder are formed of elastomeric material in the range of 1 mm (0.04 inch) to 2.54 mm (0.100 inch) in thickness.

BRIEF DESCRIPTION OF THE DRAWINGS

The present invention will now be described, by way of example, with reference to the accompanying drawings, in which.

DESCRIPTION OF THE PREFERRED EMBODIMENT

Figure 2:
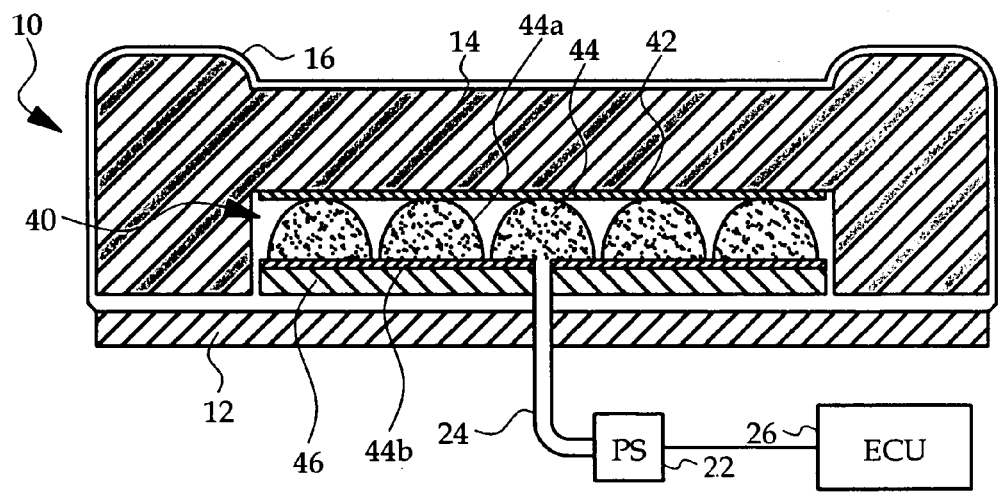
FIG. 2 is a diagram of a vehicle seat bottom including a fluid-filled seat bladder assembly according to a first embodiment of this invention.
Figure 3:
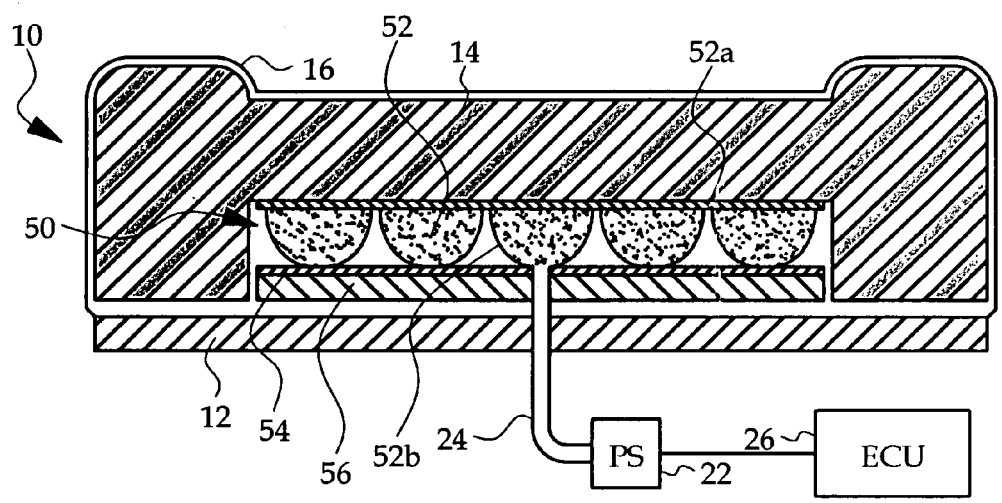
FIG. 3 is diagram of a fluid-filled seat bladder according to a second embodiment of this invention.
Figure 4:
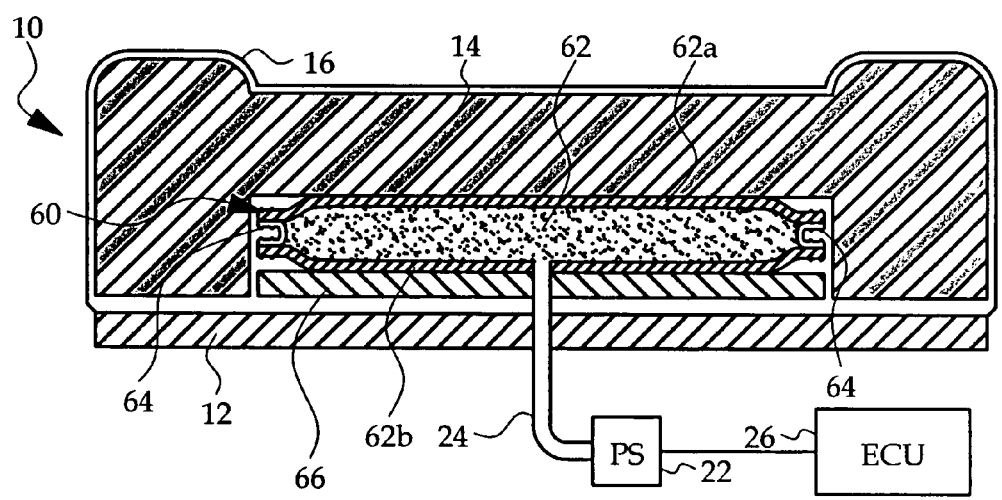
FIG. 4 is diagram of a fluid-filled seat bladder according to a third embodiment of this invention.

Referring to the drawings, and particularly to FIGS. 2, 3 and 4, the reference numerals 40, 50 and 60 generally designate bladder assemblies for a vehicle seat bottom 10 according to a first, second and third embodiments of the present invention. As with the prior art bladder assembly 18, the bladder assemblies 40, 50, 60 are each disposed below a central portion of the seat bottom 10 between the foam cushion 14 and the seat suspension 12. The bladder assembly 40 of FIG. 2 includes an upper interface panel 42, a fluid-filled bladder 44 and a felt pad 46; the bladder assembly 50 of FIG. 3 includes a fluid-filled bladder 52, a lower interface panel 54 and a felt pad 56; and the bladder assembly 60 of FIG. 4 includes a fluid-filled bladder 62 and a felt pad 66.

Whereas the prior art seat bladder 20 has upper and lower sheets 20a, 20b formed of elastomeric material having a thickness of approximately 0.375 mm (0.015 inch), the bladders 44, 52, 62 according to the present invention have at least one layer formed of elastomeric material having a thickness in the range of 1 mm (0.04 inch) to 2.54 mm (0.100 inch), and preferably approximately 1.50 mm (0.060 inch). In the first embodiment (FIG. 2), the bladder 44 has an upper sheet or layer 44a formed of elastomeric material having a thickness of approximately 0.375 mm (0.015 inch), and a lower layer 44b formed of elastomeric material having a thickness in the range of 1 mm (0.04 inch) to 2.54 mm (0.100 inch). In the second embodiment (FIG. 3), the bladder 52 has an upper sheet or layer 52a formed of elastomeric material having a thickness in the range of 1 mm (0.04 inch) to 2.54 mm (0.100 inch), and a lower layer 52b formed of elastomeric material having a thickness of approximately 0.375 mm (0.015 inch). In the third embodiment (FIG. 4), the bladder 62 has upper and lower layers 62a, 62b, both formed of elastomeric material having a thickness in the range of 1 mm (0.04 inch) to 2.54 mm (0.100 inch).

Referring to FIG. 2, forming the lower layer 44b of bladder 44 of elastomeric material having a thickness in the range of 1 mm (0.04 inch) to 2.54 mm (0.100 inch) allows the bladder itself to serve the functions formerly served by interface panel 32 of the prior art bladder assembly 18. As with the prior art bladder 20, the upper sheet 44a of bladder 44 may still be spot welded to the lower sheet 44b as shown to prevent pooling and reduce the overall bladder weight. Also, the upper interface panel 42 and/or felt 46 may be omitted, depending on the application.

Referring to FIG. 3, forming the upper layer 52a of bladder 52 of elastomeric material having a thickness in the range of 1 mm (0.04 inch) to 2.54 mm (0.100 inch) allows the bladder itself to serve the functions formerly served by the upper interface panel 36 of the prior art bladder assembly 18. As with the prior art bladder 20, the lower sheet 52b of bladder 52 may still be spot welded to the upper sheet 52a as shown to prevent pooling and reduce the overall bladder weight. Also, the felt 56 may be omitted, depending on the application.

Figure 1:
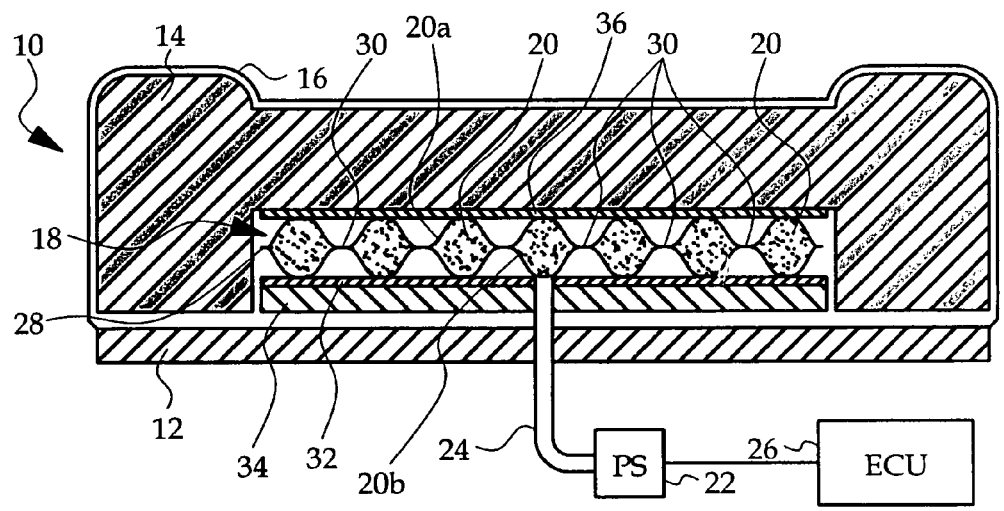
FIG. 1 is a diagram of a vehicle seat bottom including a prior art fluid-filled seat bladder assembly.

Referring to FIG. 4, forming both upper and lower layers 62a, 62b of bladder 62 of elastomeric material having a thickness in the range of 1 mm (0.04 inch) to 2.54 mm (0.100 inch) allows the bladder itself to serve the functions formerly served by upper and lower interface panels 36, 32 of the prior art bladder assembly 18. The upper and lower sheets 62a, 62b may be inter-peripherally spot welded if desired, but the bladder fluid has reduced tendency to pool when the relatively thick bladder material is utilized. The peripheral portions of the sheets 62a, 62b may be welded together as in the prior art bladder 20 of FIG. 1, or joined by a thin annular sheet 64 of elastomeric material (i.e., material having a thickness of approximately 0.375 mm (0.015 inch)) seam welded to both upper and lower sheets 62a, 62b as shown in FIG. 4. Additionally, it may be desirable to include a baffle mechanism within the bladder 62 to prevent sloshing of the bladder fluid; the baffle mechanism may be implemented with a foam material having very large open cells, or with individual straps of material welded to both upper and lower sheets of the bladder. As with the other embodiments, the felt pad 66 may be omitted, depending on the application.

In summary, the present invention provides an improved fluid-filled seat bladder constructed of unusually thick elastomeric material so that one or both of the usual upper and lower interface panels of a bladder assembly can be omitted. This decreases the bladder assembly part count (thus facilitating installation of the bladder assembly in a seat), and also reduces cost because the part savings easily exceeds the added cost of the thicker bladder material. While the invention has been described in reference to the illustrated embodiments, it should be understood that various modifications in addition to those mentioned above will occur to persons skilled in the art. For example, the bladder assemblies 40, 50, 60 may be mounted inside a seat cushion, or on a pan-type seat frame, and so on. Accordingly, it will be understood that bladder assemblies incorporating these and other modifications may fall within the scope of this invention, which is defined by the appended claims.

The invention claimed is:

1. A fluid-filled elastomeric bladder assembly adapted for disposition in a vehicle seat intermediate an occupant load bearing seat cushion and an underlying spring suspension structure for occupant weight estimation, said fluid-filled elastomeric bladder assembly comprising:
   upper and lower interface panels formed of relatively thick rigid material for occupant load distribution;
   a sheet of relatively thin elastomeric material disposed between said upper and lower interface panels and peripherally joined to one of said interface panels to form a closed bladder and defining a volume therebetween for filling with a fluid, said sheet of thin elastomeric material and the interface panel to which it is peripherally joined forming upper and lower load bearing surfaces; and
   a port extending through said bladder and adapted for establishing fluid communication between said bladder volume and a fluid pressure sensor.

2. An elastomeric bladder assembly according to claim 1, wherein said first sheet of elastomeric material has a thickness of approximately 0.375 mm (0.015 inch) and the interface panel to which it is peripherally joined has a thickness of approximately 1.50 mm (0.60 inch).

3. An elastomeric bladder assembly according to claim 2, wherein said sheet forms the upper load bearing surface of said bladder.

4. An elastomeric bladder assembly according to claim 2, wherein said sheet forms the lower load bearing surface of said bladder.

5. The elastomeric bladder assembly of claim 1, further comprising at least one interperipherial spot weld locally joining said sheet of elastomeric material and the interface panel to which it is peripherally joined.

* * * * *